(12) United States Patent
Weichert et al.

(10) Patent No.: US 7,487,127 B2
(45) Date of Patent: Feb. 3, 2009

(54) MERCHANT CASH PAYMENT SYSTEMS AND METHODS

(75) Inventors: Margaret Morgan Weichert, San Carlos, CA (US); John Joseph Mascavage, III, San Mateo, CA (US); David L. Hansen, Highlands Ranch, CO (US); Mark D. Baumgart, Larkspur, CO (US); Peter M. Karas, Lakewood, CO (US); Richard G. Wilber, Denver, CO (US)

(73) Assignees: First Data Corporation, Greenwood Village, CO (US); The Western Union Company, Englewood, CO (US)

( * ) Notice: Subject to any disclaimer, the term of this patent is extended or adjusted under 35 U.S.C. 154(b) by 887 days.

(21) Appl. No.: 10/262,053

(22) Filed: Sep. 30, 2002

(65) Prior Publication Data

US 2003/0187791 A1 Oct. 2, 2003

Related U.S. Application Data

(63) Continuation-in-part of application No. 10/262,530, filed on Sep. 30, 2002, which is a continuation-in-part of application No. 10/109,559, filed on Mar. 27, 2002.

(51) Int. Cl.
*G06Q 40/00* (2006.01)
(52) U.S. Cl. .................. 705/40; 705/35; 705/39
(58) Field of Classification Search .......... 705/35, 705/39, 40
See application file for complete search history.

(56) References Cited

U.S. PATENT DOCUMENTS

| | | | |
|---|---|---|---|
| 5,220,501 A | | 6/1993 | Lawlor et al. |
| 5,221,838 A | * | 6/1993 | Gutman et al. ............. 235/379 |
| 5,546,523 A | * | 8/1996 | Gatto .......................... 345/811 |
| 5,555,496 A | | 9/1996 | Tackbary et al. |
| 5,677,955 A | * | 10/1997 | Doggett et al. ................ 705/76 |
| 5,699,528 A | | 12/1997 | Hogan |
| 5,757,917 A | | 5/1998 | Rose et al. |

(Continued)

FOREIGN PATENT DOCUMENTS

EP 0949596 10/1999

(Continued)

OTHER PUBLICATIONS

O'Mahony, Donal; Peirce, Michael; and Tewari, Hitesh; "Electronic Payment Systems"; 1997; Artech House Publishers; pp. 70, 71, 77, & 78.*

(Continued)

*Primary Examiner*—Ella Colbert
(74) *Attorney, Agent, or Firm*—Townsend and Townsend and Crew LLP

(57) ABSTRACT

A method for facilitating the sale of goods or services comprises receiving at an ordering system payment information relating to a payment instrument that is being used to purchase a good or a service from a merchant. The ordering system transmits a message to the merchant that includes information on the good or service being purchased to permit the merchant to provide the good or service. Funds are collected from an account associated with the payment instrument, and the ordering system transmits to a money transfer computer system information useable by the money transfer computer system to provide a cash payment to the merchant.

19 Claims, 2 Drawing Sheets

U.S. PATENT DOCUMENTS

| | | | |
|---|---|---|---|
| 5,799,087 A * | 8/1998 | Rosen | 705/69 |
| 5,826,241 A | 10/1998 | Stein et al. | |
| 5,899,980 A | 5/1999 | Wilf et al. | |
| 5,920,847 A * | 7/1999 | Kolling et al. | 705/40 |
| 5,952,638 A * | 9/1999 | Demers et al. | 235/379 |
| 5,960,412 A | 9/1999 | Tackbary et al. | |
| 5,987,140 A | 11/1999 | Rowney et al. | |
| 5,987,429 A | 11/1999 | Maritzen et al. | |
| 5,991,750 A | 11/1999 | Watson | |
| 5,999,625 A | 12/1999 | Bellare et al. | |
| 6,012,045 A | 1/2000 | Barzilai et al. | |
| 6,012,048 A | 1/2000 | Gustine et al. | |
| 6,014,646 A * | 1/2000 | Vallee et al. | 705/39 |
| 6,016,484 A * | 1/2000 | Williams et al. | 705/39 |
| 6,029,150 A * | 2/2000 | Kravitz | 705/39 |
| 6,032,133 A | 2/2000 | Hilt et al. | |
| 6,044,363 A | 3/2000 | Mori et al. | |
| 6,058,379 A | 5/2000 | Odom et al. | |
| 6,058,417 A | 5/2000 | Hess et al. | |
| 6,070,798 A | 6/2000 | Nethery | |
| 6,073,117 A | 6/2000 | Oyanagi et al. | |
| 6,098,053 A | 8/2000 | Slater | |
| 6,112,984 A * | 9/2000 | Snavely | 235/379 |
| 6,119,106 A | 9/2000 | Mersky et al. | |
| 6,122,625 A | 9/2000 | Rosen | |
| 6,167,386 A | 12/2000 | Brown | |
| 6,175,823 B1 | 1/2001 | Van Dusen | |
| 6,246,996 B1 | 6/2001 | Stein et al. | |
| 6,397,194 B1 * | 5/2002 | Houvener et al. | 705/16 |
| 6,460,020 B1 * | 10/2002 | Pool et al. | 705/26 |
| 6,601,759 B2 * | 8/2003 | Fife et al. | 235/375 |
| 6,609,113 B1 * | 8/2003 | O'Leary et al. | 705/39 |
| 2002/0069166 A1 * | 6/2002 | Moreau et al. | 705/40 |

FOREIGN PATENT DOCUMENTS

| | | |
|---|---|---|
| EP | 1077436 | 2/2001 |
| WO | PCT/US99/19628 | 4/2000 |
| WO | PCT/US99/29312 | 6/2000 |
| WO | PCT/US00/03526 | 9/2000 |
| WO | PCT/US00/11732 | 11/2000 |
| WO | PCT/US00/16669 | 12/2000 |
| WO | PCT/US00/18582 | 1/2001 |

OTHER PUBLICATIONS

Intell-A-Check, Internet, http://www.icheck.com, Feb. 7, 2000.
Debit-it, Internet, http://www.debit-it.com, Feb. 7, 2000.
dotBank, Internet, http://www.dotbank.com, Feb. 7, 2000.
TeleCheck, Making checks Our Responsibility, Internet, http://www.telecheck.com, Feb. 7, 2000.
TeleCheck, Verification Services, Internet, http://telecheck.com, Feb. 7, 2000.
Transpoint, Internet, http://www.transpoint.com, Feb. 10, 2000.
PayPal.com, Internet, http://www.paypal.com, Feb. 7, 2000.
PayMe.com, Internet, https://ssl.idealab.com, Feb. 16, 2000.

* cited by examiner

MERCHANT CASH PAYMENT SYSTEMS AND METHODS

This application is a continuation in part of U.S. patent application Ser. No. 10/262,529, filed on the same date as the present application which is a continuation in part of U.S. patent application Ser. No. 10/109,559 filed on Mar. 27, 2002, which are incorporated herein by reference in their entirety.

BACKGROUND OF THE INVENTION

This invention relates generally to the field of purchasing, and in particular to the purchasing of goods and services at a location remote from a merchant. More specifically, the invention relates to the providing of cash or cash equivalents to merchants as payment for goods or services.

One traditional purchasing model is to offer goods or services for sale at a brick and mortar location. To make the purchase, the customer physically enters into the store, selects an item, and then makes payment. This payment may be in the form of cash, check, credit card, debit card or the like.

Methods for placing orders and making payments have become more complex with the advent of e-commerce, mail order companies and the like. For example, many merchants now offer their goods or services on websites that are accessible over the Internet. In such cases, a consumer may make a purchase by accessing the website, selecting an item offered at the site and then providing a credit card number. If the credit card is accepted, the consumer's credit card account is charged and the item is shipped to an indicated address. Using standard credit card processing and settlement techniques, the merchant's bank account is eventually credited with a payment.

However, some merchants are unable to accept credit cards or similar payment instruments for a variety of reasons. For example, the merchant may not qualify to be serviced by a credit card processor. As another example, the merchant may not have a bank account where funds may be deposited, or may live in a country where doing business by credit cards is difficult or impossible.

Hence, this invention is related to the providing of cash or similar types of payments to merchants in exchange for goods or services offered by the merchant. Such payments are provided regardless of the type of payments tendered by their customers.

BRIEF SUMMARY OF THE INVENTION

The invention provides various systems and methods for facilitating the sale of goods or services. Such systems and methods are particularly useful in facilitating cash payments to merchants in exchange for their goods or services, while also permitting customers to use a wide variety of payment forms. According to one method, an ordering system is used to receive payment information relating to a payment instrument that is being used to purchase a good or service from a merchant. The ordering system is also employed to transmit a message to the merchant having information on the good or service. In this way, the merchant is able to obtain ordering information to permit the merchant to provide the good or service to the consumer. Funds are also collected from an account that is associated with the payment instrument in order to pay for the good or service. The ordering system further transmits to a money transfer computer system information that is usable by the money transfer computer system to provide a cash payment to the merchant.

The information relating to the payment instrument may be received at a web server computer that is part of the ordering system. In this way, the server computer may be used to host a website that offers the good or service for sale. This website may also collect the payment instrument number from the consumer. Alternatively, the ordering system may include a host payment computer system that may receive the payment information from the consumer. In this way, once a consumer has selected a good (such as from a website or mail order catalog), the payment information may be provided to the ordering system using a host payment computer system.

Before sending a message to the merchant to ship the good, the ordering system may transmit an authorization request to a merchant bank. Any approval from the merchant bank is received back at the ordering system.

The funds may be collected from the account associated with the payment instrument by transmitting from the ordering system to the merchant bank a ticket requesting payment. The merchant bank may then transfer funds to a host account as requested by the ticket. The ticket may be transmitted from the merchant bank to an issuing bank so that the merchant bank may be paid and so that the consumer may be billed by the issuing bank.

To provide the cash payment to the merchant, the ordering system or the money transfer computer system may transmit a cash pick-up identifier to the merchant. The merchant may then proceed to a money transfer location, provide the identifier and receive a cash payment. During the process, the money transfer computer system may be accessed to validate the identifier and the payment amount. A reconciliation may also be made between the ordering system and the money transfer system by transferring the payment amount from the host account to the money transfer system. Anywhere along the way, fees may be collected in addition to or deducted from the payment amount.

The invention may also utilize an ordering system having a processor, memory and one or more executable programs for implementing any of the processes described above. The ordering system may in some embodiments include a server computer that maybe used to host websites where goods or services are offered for sale. In other embodiments, the ordering system may include a host payment computer system for receiving a processing payment information.

DETAILED DESCRIPTION OF THE INVENTION

The invention provides systems and methods that enable merchants to be paid using alternative forms of payments when the merchants are unable to, or choose not to, accept certain types of payment instruments. For example, some merchants may wish to be paid only in cash or some type of cash equivalent, such as by a money order, check, certified check or the like. The invention permits such merchants to receive payments in cash or cash equivalents while still permitting their customers to use their payment instrument of choice. For example, merchants may be paid in cash even though their customers use payment instruments such as credit cards, debit cards, stored value cards and the like to make the purchase. In this way, consumers may use a payment instrument of their choice, and the merchant may be paid in cash or a cash equivalent. Further, in some cases, the merchant may also be paid in a currency of the merchant's choice.

The invention may find use in a variety of settings. For example, the invention may be used in situations where the merchant is remotely located for its customers. Examples of such situations include those where the goods or services are offered for sale on a website, from a mail order catalog or simply by word of mouth. However, the invention may also be used in brick and mortar stores as well. The invention may also be particularly useful when the merchant does not have a bank account into which funds from a credit card payment may be deposited. Also, in some cases, a merchant may not qualify to have its transactions processed by a credit card processing company, but may do so if handled by a third party.

The invention may further be used in connection with the sale of essentially any type of good or service. For convenience of discussion, the description may refer to only a good or a service; however, it will be appreciated that the invention may still apply to both.

Figure 1:
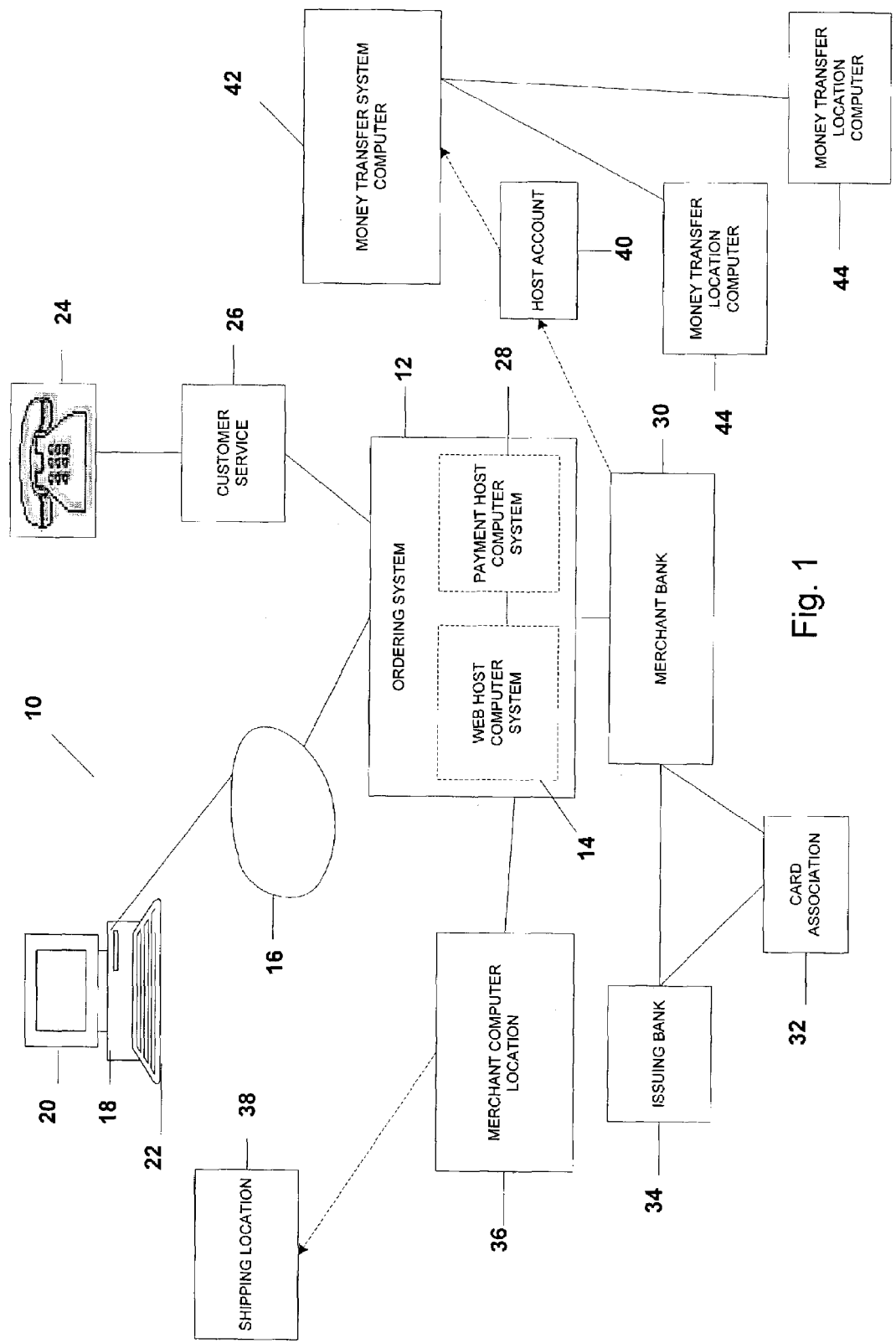
FIG. 1 is a schematic diagram of a system for facilitating payments to merchants according to the invention.

Referring now to FIG. 1, one embodiment of a system 10 for facilitating payments to merchants in exchange for goods or services will be described. Central to system 10 is an ordering system 12 that may function to provide a variety of services. For example, ordering system 12 may include a web host computer system 14 that may host websites for merchants. In this way, consumers may have access to goods that are offered for sale simply by accessing host computer system 14 over a network 16, such as a wide area network, the Internet, a local area network, a wireless network or the like. Conveniently, access to such websites may be made using any type of computer 18 that is capable of communicating over such a network and that is able to display web documents and permit information to be entered and transmitted across network 16. Examples of such computers include personal computers with web browsers, laptops, PDA's, wireless phones with browsers, and the like.

As is known in the art, web host computer system 14 may transmit documents to computer 18 to permit various web pages to be displayed on a display screen 20. These pages may be navigated and information may be entered using a keyboard 22 or some other type of entry device. For example, the web pages may display various goods that are offered for sale by a merchant. To purchase one of the goods, the consumer may select the item using keyboard 22 or some type of pointing device. The consumer may also enter a shipping address and payment information, such as a credit card number. The order may then be submitted to computer system 14 for processing as described herein.

In some cases, the merchant may host his own website or use another third party to host the site. As an alternative, orders for goods or services may be received from telephone or in writing on an order form. For instance, using a phone 24, a consumer may call a customer service or ordering center 26 and order a good that was seen in a catalog, on television, other advertisement or the like. An ordering representative may take the order along with the payment information, enter this into a computer and electronically transmit the information to ordering system 12. In such cases, ordering system 12 may include a payment host computer system 28 that is configured to take such orders.

For example, if a merchant hosts his own website and an item is selected for purchase, the consumer may be transferred to payment host computer system 28 that produces a web page where payment and shipping information may be entered. Examples of how consumers may be transferred to a payment website after selecting an item for purchase at another website are described in copending U.S. application Ser. No. 09/991,379, filed Nov. 15, 2001, the complete disclosure of which is herein incorporated by reference. Alternatively or in addition to, payment host computer system 28 may simply provide an interface for receiving ordering and payment information from other types of computer systems, such as those used by call centers that take orders over the phone or processing centers that process written orders.

When ordering system 12 receives an order along with payment information, such as a credit card number, ordering system 12 may follow a procedure for authorizing the charge and for settlement of the payment with the various parties involved in the transaction. Further, although described in terms of a credit card transaction, it will be appreciated that other processes may be used for different payment instruments, such as debit cards used in connection with ATM networks.

Hence, ordering system 12 may optionally be coupled to a credit card transaction network to facilitate the acceptance of credit cards when the consumer makes a purchase. After receipt of the payment information, an authorization request may be transmitted to a merchant or acquiring bank 30 for authorization. It will be appreciated that the merchant bank may contract with another entity to maintain a computer system that stores and processes account information for the merchant bank's customers. In the case of interchange cards, the merchant bank 30 typically does not have direct access to information regarding cardholder account status, so merchant bank 30 may forward the request to an appropriate card association 32 (such as VISA or MASTERCARD) for authorization. The authorization information may be provided from an issuing bank 34 that issued the customer's credit card.

If the transaction is authorized, an authorization code is returned to ordering system 12 so that the transaction may be completed as described hereinafter. The ordering system 12 completes the sales transaction with the cardholder by transmitting a message to a merchant computer or merchant location 36 to permit the ordered goods to be shipped. The message may include information identifying the purchase item or items and one or more shipping locations 38. In this way, the ordered goods may be packed and shipped to the requested locations.

Ordering system 12 also generates a ticket representing the cardholder's agreement to pay the card issuer 34. The ticket is an electronic document that provides sufficient information to identify the cardholder, the card used, the merchant, and the amount of the sales transaction.

The process for paying the merchant in cash for the delivery of the goods or services proceeds by electronically presenting the ticket to the merchant bank 30. Conveniently, the ordering system 12 may accumulate tickets from a number of sales transactions (e.g., all transactions from one day) and presents a batch of tickets together to the merchant bank 30. The merchant bank acquires the ticket and deposits funds into a host account 40. The amount of funds deposited into the host account 40 maybe less than the amount of the sales transaction by a percentage (the "discount rate") established between the merchant (or the ordering system) and the merchant bank 30. The merchant bank may also maintain a reserve against the ordering system organization by temporarily withholding part of the funds in order to cover the risk that the merchant bank is not subsequently repaid by a card issuer for any of the transactions associated with the ordering system organization. Funds held in reserve may be released to the ordering system organization after some period of time.

The merchant bank 30 settles with the card issuer 34 by presenting the ticket to the card issuer. Settlement requests may be processed in batches and routed through the card association 32 rather than being sent directly to the card issuer. The card issuer 34 transfers funds to the merchant bank 30 in exchange for the ticket. The amount of funds transferred may be less than the amount of the sales transaction because the card issuer may deduct an "interchange fee" reflecting the delay between the card issuer's payment to the merchant bank and the cardholder's payment to the card issuer. At some point after settlement, the card issuer may bill the cardholder for the full amount of the transaction, and the cardholder may pay the card issuer according to the terms of their agreement.

In a transaction where a private label credit card is used, the processing is similar, except that the merchant bank 30 and the card issuer 34 are generally the same entity. Thus, the merchant bank is able to authorize the transaction, and a settlement between the card issuer and the merchant bank is not required. A similar scenario is presented when the merchant bank 30 and issuing bank 34 use the same processing organization.

When the funds (or a promise to pay the funds) are deposited in host account 40, a message is sent to a money transfer system computer 42 to begin the process of paying the merchant in cash or a cash equivalent to complete the transaction. The message may include information such as the amount to pay the merchant, a desired form of payment (such as cash or a cash equivalent), a desired currency, identification information and the like.

In some cases, the merchant may be provided with a notification of where to pick up the funds, such as at any one of a variety of money transfer location computers 44. Optionally, the merchant may be provided with some type of identifier that must be provided at the money transfer location 44 in order to receive the funds. The identifier and location information may be transmitted to the merchant using ordering system 12 (such as when transmitting the ordering and shipping information to the merchant), or by money transfer system computer 42. This message may be electronic, by mail, by fax, or the like.

When ready to receive the funds, the merchant simply proceeds to one of the money transfer locations and provides the necessary identification information into computer 44. This may be performed by the merchant or another worker at the location. This information is transmitted to money transfer system computer 42 for verification. If approved, a message is transmitted back to computer 44 indicating that a payment of a certain amount may be made. Conveniently, the merchant may request the payment in a variety of forms and may specify a desired currency. One non-limiting example of such a money transfer system is that operated by Western Union where a central computer stores payment information and remote computers are operated by various agents to access the payment information stored in the central computer.

Figure 2:
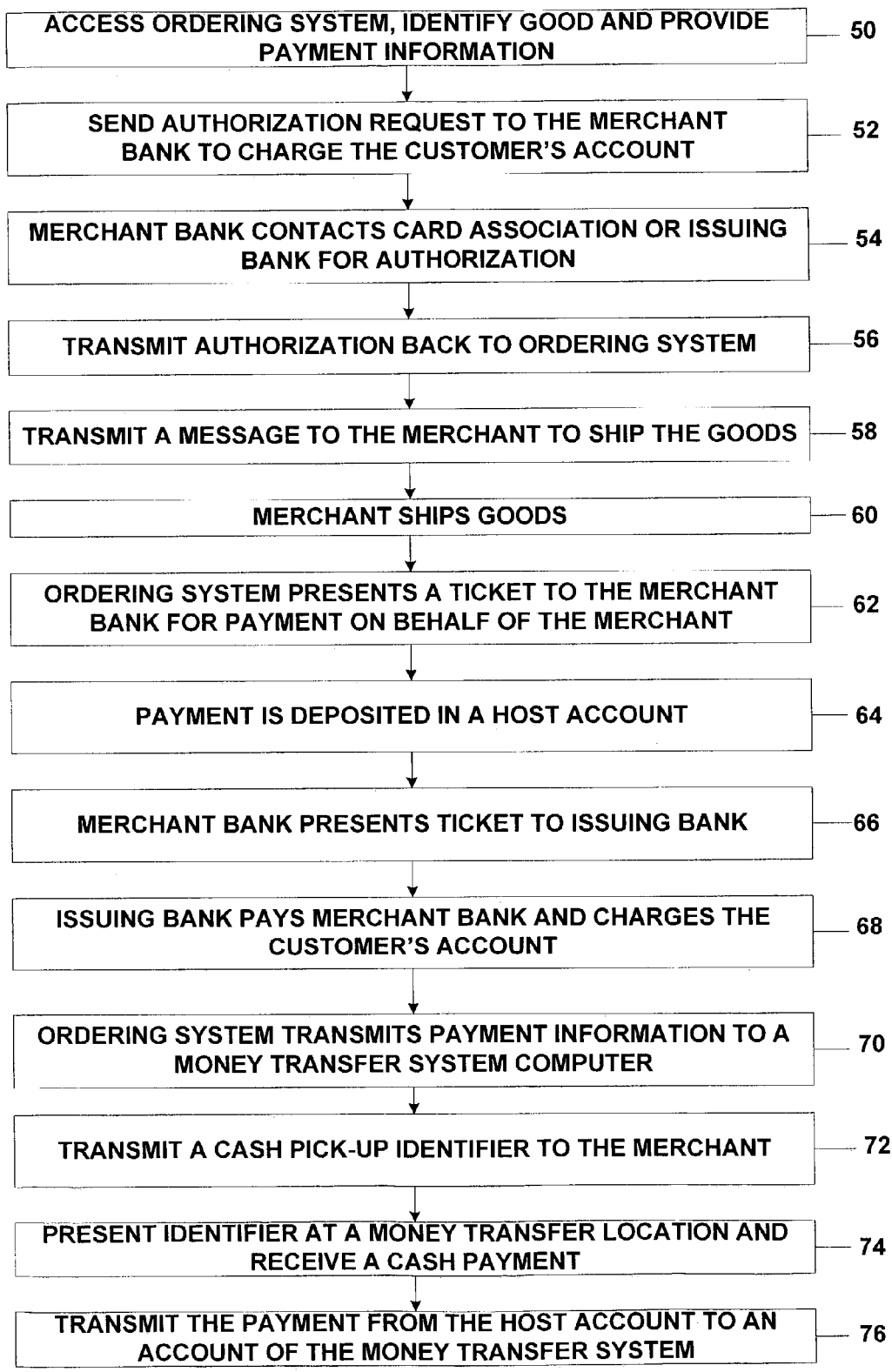
FIG. 2 is a flowchart illustrating one method for purchasing goods or services from a merchant according to the invention.

Referring now to FIG. 2, one method for purchasing goods or services and for paying the merchant in cash or a cash equivalent will be described. In describing the method outlined in FIG. 2, it will be appreciated that the steps are not necessarily in order and may proceed in a variety of sequences. As illustrated at step 50, a customer may access an ordering system to select a good or service for purchase. The ordering system may take on a variety of forms, such as a web site that offers goods or services for sale, a call center that receives calls from goods or services offered in a mailing, catalog, on television, on the Internet, or the like. As another example, the ordering system may have a mail room where orders are received by mail. The order may be received in the form of an electronic order directly from the customer (such as when providing information request on a web page and transmitting the document over a network to the ordering system) or may received in verbal or written form. In such cases, the ordering information may be entered into a computer so that the ordering system will have an electronic document.

Along with an identification of the good, the customer may also provide payment information or an actual payment. This may be in the form of a credit card number, a debit card number (with or without a PIN), a bank account number, a traditional check, a money order, cash or the like. Along with the payment information, the customer may provide additional information needed to complete the transaction, such as name, address, shipping location, quantity, form of shipment, and the like.

In the case of a credit card payment, the ordering system may send a request to the merchant bank (or a processor for the merchant bank) to charge the customer's account for the amount of the order as shown in step 52. The merchant bank may then contact a card association or the issuing bank (or its processor) for authorization to charge the account associated with the credit card as shown in step 54. If authorized, an authorization is sent to the ordering system as shown in step 56.

If payment is made in other forms, appropriate steps may be followed to process the payment. For example, in the case of a debit card, the issuing bank may be contacted to insure the account has sufficient funds and to earmark those funds. Actual funds transfers may occur over an ATM network. As another example, funds transfers may occur using an ACH transfer. A similar process may occur in the form of payment by check. In some cases, the ordering system may wait until the funds are actually received before continuing the process.

As shown in step 58, once appropriate payment information is received (and verified and processed, if necessary), a message is transmitted to the merchant requesting that the goods be shipped as requested by the customer. This may take the form of an electronic message, such as an email, or may take other forms, such as by mail, facsimile, telephone or the like. The information provided to the merchant may include information such as the customer's name, a recipient's name (if different than the customer), a shipping location, the form of payment, the name of the good, the quantity of the good, any special shipping requests, other comments and the like.

Upon receipt of this message, the merchant may ship the goods as illustrated in step 60. In some cases, the merchant may choose when to ship the goods based on the form of payment. For example, in the case of credit card or cash payments, the merchant may choose to ship as soon as the message is received since there are guaranteed good funds. In other cases, such as when paying by check or debit card, the merchant may wait until the funds are actually received at the ordering system. In such cases, the ordering system may send a follow up message to the merchant when the funds are received. Alternatively, the ordering system proprietors may guarantee the funds to the merchant and take the risk of collection so that the goods may be shipped in an expedited manner. To compensate for the increased risk, the ordering system may charge a larger fee to the merchant.

In the case of credit card payments, the ordering system presents a ticket to the merchant bank requesting payment on behalf of the merchant as shown in step 62. The ticket may be an electronic document having the ordering and payment information provided by the customer, or it may be a paper ticket, such as a copy of a hand written order. This is analogous to traditional credit card processing where the merchant typically requests payment for the goods from its merchant bank using a ticket. In this case, however, the ordering system is acting on behalf of the merchant and requests the funds on its behalf. As shown in step 64, the payment is deposited in a host account on behalf of the merchant. This host account may be controlled by the proprietor of the ordering system. The merchant bank may then present the ticket to the issuing bank as shown in step 66. In step 68, the issuing bank pays the merchant bank and charges the customer's account.

Once the ordering system (or the host account) has received payment or an offer of payment, the ordering system transmits payment information to a money transfer system computer as shown in step 70. In this way, the money transfer system may be used to deliver a cash payment to the merchant. Alternatively, the money transfer system may pay the merchant in any form of payment requested by the merchant, such as by money order, certified check, or the like.

To facilitate payment, some type of identifier may be transmitted to the merchant as illustrated in step 72. This identifier may be assigned by the ordering system and transmitted both to the customer and the money transfer system. The transmission may take a variety of forms, such as by an e-mail, by regular mail, by facsimile, or the like. Another way to provide the identifier to the customer is to have the money transfer system transmit the identifier to the merchant using any of the techniques just described. The identifier is stored in the money transfer system computer. As such, when the merchant is ready for payment, the merchant may proceed to a money transfer location and provide the identifier to the worker as shown in step 74. The worker may enter this into a computer that has a record of the identifier, or which may access a host computer for the identifier. Optionally, the worker may also ask the merchant for some type of identification, such as a government issued document. When the identifier is entered into the computer, the computer may access and display a file having information on the amount of payment, the merchant's name and the like. The merchant may then be paid in the desired form of payment, such as in cash.

In some cases, the payment by the customer may be in a different currency than that desired by the merchant. In such cases, the money transfer system may perform a currency conversion and pay the merchant in the desired currency.

Once the merchant has been paid, a financial reconciliation between the money transfer system and the ordering system may occur as shown in step 76. For example, the payment from the merchant may be transmitted from the host account to an account of the money transfer system. This may be in real time or by a batch process where several accounts are reconciled at the same time.

Hence, with such a process, the customer may order goods or services and make a payment using essentially any type of payment instrument. Further, the merchant may receive a payment in cash (or in any form requested by the merchant). An ordering system and a money transfer system may be used as intermediaries to facilitate such payments. Various fees may be charged by the merchant, the ordering system and the money transfer system to pay for their services.

The invention has now been described in detail for purposes of clarity and understanding. However, it will be appreciated that certain changes and modifications may be practiced within the scope of the appended claims.

What is claimed is:

1. A computer-implemented method for facilitating the sale of goods or services, the method comprising:
   receiving, at an ordering system, payment information relating to a payment instrument being used to provide payment over the Internet for purchase of a good or a service;
   transmitting from the ordering system a message to a merchant that includes information on the good or service being purchased to permit the merchant to provide the good or service;
   collecting funds from an account associated with the payment instrument; and
   transmitting a money transfer request from the ordering system to a money transfer computer system operable to process requests to transfer monetary values to designated recipients independently of a banking account of the recipients, the money transfer request including information usable by the money transfer computer system to provide a cash payment to the merchant for the Internet purchase, so that a cash payment is made rather than a deposit to a bank account of the merchant.

2. A computer-implemented method as in claim 1, wherein the information relating to the payment instrument is received from a web server computer system of the ordering system that hosts a website that offers the good or service for sale over a network and which collects a payment instrument number.

3. A computer-implemented method as in claim 1, wherein the information relating to the payment instrument is received from a customer computer at a host payment computer system of the ordering system and comprises a payment instrument number.

4. A computer-implemented method as in claim 1, further comprising transmitting from the ordering system to a merchant bank a request for authorization to charge the account associated with the payment instrument.

5. A computer-implemented method as in claim 4, further comprising receiving at the ordering system an authorization to charge the account.

6. The computer-implemented method as in claim 5, wherein the payment instrument is a credit card, debit card or the like, whereby a customer may use a payment instrument account for the Internet purchase, and whereby the merchant may receive payment for the purchase through the money transfer computer system in the form of cash without payment attributable to the purchase from a card issuer being paid into a banking account of the merchant.

7. A computer-implemented method as in claim 1, further comprising shipping the good from the merchant to the customer.

8. A computer-implemented method as in claim 1, wherein the funds are collected by transmitting from the ordering system to a merchant bank a ticket requesting payment, and by transferring funds from the merchant bank to a host account.

9. A computer-implemented method as in claim 8, further comprising transmitting the ticket to an issuing bank to permit the issuing bank to pay the merchant bank and to bill the account of the customer.

10. A computer-implemented method as in claim 8, further comprising transmitting funds from the host account to an account associated with money transfer computer system.

11. A computer-implemented method as in claim 1, further comprising transmitting to the merchant from the ordering system or from the money transfer computer system a cash pick-up identifier.

12. A computer-implemented method as in claim 11, further comprising receiving the cash pick-up identifier at a money transfer location computer, transmitting the identifier to the money transfer computer system for verification, and providing the cash payment to the merchant.

13. A method for facilitating the sale of goods or services using a payment instrument over the Internet, the method comprising:
- receiving at a money transfer computer system a request to make a cash payment to a merchant independently of a banking account of the merchant;
- transmitting from the money transfer computer system to the merchant a cash pick-up identifier; and
- receiving at a money transfer location the cash pick-up identifier from the merchant; and
- making the cash payment to the merchant rather than a deposit to a bank account of the merchant.

14. A method as in claim 13, further comprising receiving a reimbursement into an account associated with the money transfer computer system based on the cash payment.

15. A computerized system for facilitating the sale of goods or services, the computerized system comprising:
- an ordering computer system having at least one computer readable storage medium having at least one computer-readable program for operation of the ordering computer system; and
- wherein the ordering computer system is configured:
  - to receive and store payment information relating to a payment instrument being used to provide payment over the Internet for purchase of good or a service from a merchant;
  - to transmit to the merchant a message that includes information on the good or service being purchased;
  - to receive collection information on funds collected from an account associated with the payment instrument; and
  - to transmit a money transfer request to a money transfer computer system operable to process requests to transfer monetary values to designated recipients independently of banking accounts of the recipients, the money transfer request including information usable by the money transfer system to provide a cash payment to the merchant for the Internet purchase rather than a deposit to a bank account of the merchant.

16. A computerized system as in claim 15, wherein the ordering computer system further comprises a server computer that is configured to produce web pages on a customer computer to permit a customer to enter and transmit ordering information back to the server computer.

17. A computerized system as in claim 15, wherein the ordering computer system further comprises a host payment computer system that is configured to receive the payment information, to transmit an authorization request to a merchant bank to charge the account associated with the payment instrument, and to receive an authorization to charge the account.

18. A computerized system as in claim 17, wherein the host payment computer system is further configured to transmit to the merchant bank a ticket requesting payment for the purchase.

19. A computerized system as in claim 17, wherein the host payment computer system is further configured to transmit to the merchant and to the money transfer computer system a cash pick-up identifier.

* * * * *

UNITED STATES PATENT AND TRADEMARK OFFICE
CERTIFICATE OF CORRECTION

| | |
|---|---|
| PATENT NO. | : 7,487,127 B2 |
| APPLICATION NO. | : 10/262053 |
| DATED | : February 3, 2009 |
| INVENTOR(S) | : Weichert et al. |

Page 1 of 1

It is certified that error appears in the above-identified patent and that said Letters Patent is hereby corrected as shown below:

Column 1, line 5, delete "10/262,529", and insert --10/262,530--.

Signed and Sealed this

Twelfth Day of May, 2009

JOHN DOLL
*Acting Director of the United States Patent and Trademark Office*